Aug. 8, 1944.　　F. G. W. SPEARS　　2,355,571
TUBE CLEANING APPARATUS FOR BOILERS AND THE LIKE
Filed June 25, 1942
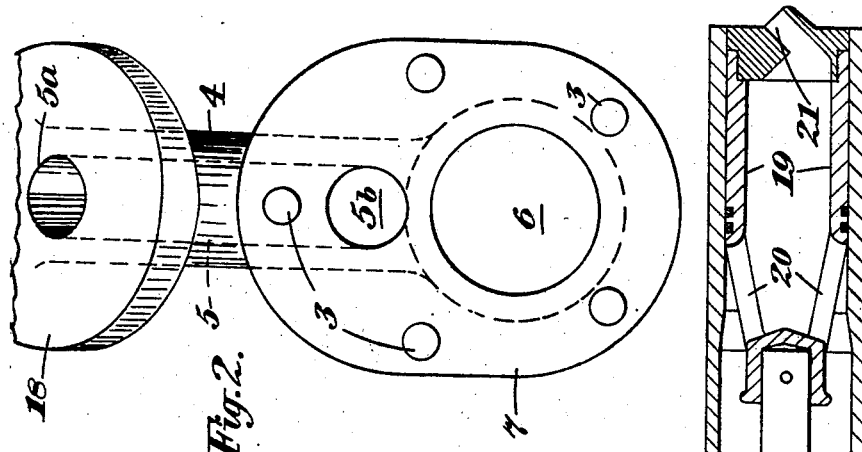
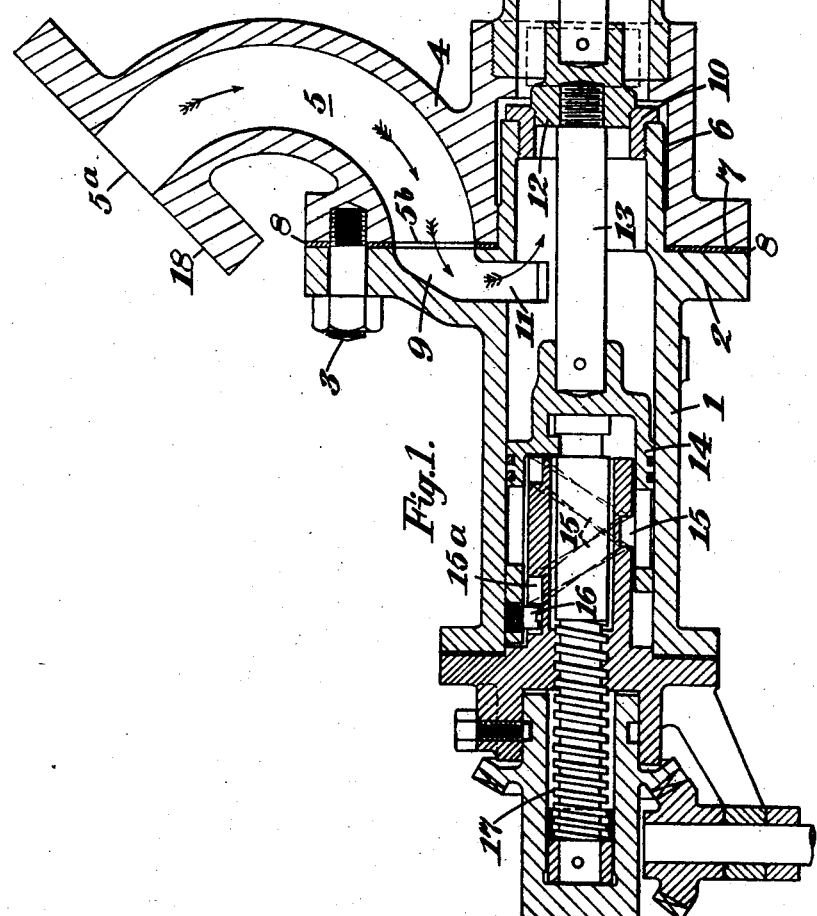
Inventor
F. G. W. Spears
By Glascock Downing & Piebold Attys Patented Aug. 8, 1944

2,355,571

UNITED STATES PATENT OFFICE 2,355,571

TUBE CLEANING APPARATUS FOR BOILERS AND THE LIKE

Frank George William Spears, Potters Bar, England, assignor of one-half to Charles Fletcher Lumb, Kingston Hill, England Application June 25, 1942, Serial No. 448,459
In Great Britain August 13, 1941

3 Claims. (Cl. 122—392)

This invention relates to apparatus, or so-called "soot blowers," for cleaning boiler or like tubes of the kind embodying an ejector for a fluid such as air or steam under pressure, hereinafter referred to generally as "steam," accommodated within a tubular casing and a steam branch projecting from a steam chest forming part of the casing and adapted for connection with the main steam supply pipe to admit the steam to the casing interior in advance of a valve in the latter which controls the admission of the steam to the ejector.

In the known apparatus of the above kind the construction of the steam branch and its connection with the steam chest is such that the steam branch joins the latter at two laterally spaced positions, where separate faces or jointings are required to effect steam-tight joints. Unless, however, the packings are of uniform thickness the maintaining of an efficient sealing is not possible and leakage of steam will occur under operating conditions.

The invention has for its object to overcome the above defect and to provide an improved apparatus of the kind referred to which can be efficiently sealed against steam leakage between the steam branch and the steam chest.

The invention consists in a boiler tube or like cleaning apparatus of the kind referred to wherein the steam branch casing is formed with two bores, one of which serves to conduct the steam from the main steam supply pipe to the steam chest and the other of which serves to receive the inner end of the steam chest, the said bores at the end thereof which connects with the steam chest terminating at a single end face of the steam branch casing whereby a single packing or face serves to effect a steam-tight joint between the steam branch casing and the steam chest, the said joint lying in one and the same plane.

In the accompanying drawing:

Figure 1 is a longitudinal section of one form of apparatus in accordance with the invention, and Figure 2 is a view looking on the left-hand end of the steam branch as seen in Figure 1.

In carrying the invention into effect as illustrated in the drawing, a tube cleaning apparatus is provided comprising a steam chest 1 in the form of a tubular casing having at its inner end a flange 2 by which the casing is secured, as by studs or bolts 3, to a steam branch casing 4 having a bore 5 therein for conducting the steam from the main steam pipe (not shown) to the interior of the steam chest 1 and another bore 6 in which the inner end of said chest is received. The outer end 5a of the bore 5 terminates at a flange 18 by which connection may be made with the main steam supply pipe.

The two said bores at one end thereof, being the end 5b in the case of the bore 5, terminate at an end face 7 of the steam branch casing, which face is a plain or flat face corresponding to the end face of the flange 2, whereby a common packing 8 located in one and the same plane can be employed to effect a steam-tight joint between the steam branch bores 5 and 6 and the casing 1. The arrangement is different therefore from other constructions incorporating a steam branch pipe with the bores therein disposed perpendicular to each other, or thereabouts, so that two separate and laterally spaced joint packings are required. Consequently, in the known constructions, unless both packings are of the same thickness it is impossible to secure a proper jointing of the surfaces involved and leakage of steam will take place.

The flange 2 of the tubular casing 1 is formed with a branch duct 9 extending outwardly from the interior of the steam chest and formed at its outer end to coincide with the bore 5 of the steam branch, which bore is preferably of curved formation as shown so that the steam enters the steam chest when travelling in a rearward direction with respect to the boiler to which the cleaning apparatus is adapted to be fitted. The arrangement, however, is such that when fitted to the boiler it is not necessary to break the main steam pipe joint with the steam branch, nor to detach the latter in order to permit of the removal of the ejector 19 and its associated parts, while at the same time the arrangement permits the use of a fixed valve seat 10 situated between the steam inlet 11 to the steam chest and the ejector 19 and which valve seat forms part of a shutdown valve of which the movable part 12 is carried at one end of a rod 13, the opposite end of which is secured to a piston 14 movable within the steam chest, under the control of a helical slot 15 and pin 16, by the rotation of a screwed spindle 17. The actual mechanism employed, however, for moving the steam ejector into and out of its operative position forms no part of the present invention but a preferred form is set forth in my co-pending application Serial No. 448,458, filed June 25, 1942. Said mechanism, however may take various and known forms provided however that for the first part of the rotational movement of the operating spindle there is imparted to the movable part 12 of the shutdown valve only a straight line or non-rotary movement sufficient to cause the valve to be fully opened, whereby it is ensured that the ejector receives the full steam supply at the time when the rotational movement thereof commences. This is ensured in the case of the construction illustrated by the helical slot 15 including an initial straight portion 15a of an effective extent sufficient to cause the valve part 12 to move completely and straight off its seat 10 to the fully open position, at which time the scroll pin 16 will enter the helical part of the scroll proper and rotation of the ejector will then take place while the ejector receives the full steam supply. The ejector is of hollow piston form, having an opening or openings 20 admitting the steam thereto, and has a nozzle 21 at its outer end through which the steam issues.

Although the improved apparatus has been illustrated as having the movable part 12 of the shut-down valve located on the side of the fixed valve seat 10 remote from the steam inlet 11, it is possible to reverse the arrangement by suitable modification of the scroll.

I claim:

1. A boiler tube or like cleaning apparatus of the character described including a steam chest provided adjacent one end with a lateral steam inlet, an ejector nozzle extending longitudinally from the chest, a valve carried by the nozzle for removably closing the adjacent end of the chest, a relatively fixed steam branch casing formed with two angularly disposed bores one of which serves to conduct the steam from the main supply pipe to the lateral inlet in the steam chest while the other is in alignment with and serves to removably receive the ejector nozzle and removably support the inner end of the steam chest, the said bores at the end thereof which connects with the steam chest terminating at a single end face of the steam branch casing whereby a single packing or face serves to effect a steam-tight joint between the steam branch casing and the steam chest, the said joint lying in one and the same plane.

2. A boiler tube or like cleaning apparatus as claimed in claim 1 wherein the lateral steam inlet in the steam chest is in the form of a branch conduit extending outwardly from the chest and terminating in the same plane as that containing the said joint.

3. A boiler tube or like cleaning apparatus as claimed in claim 1 wherein a steam chest extension is mounted in the bore of the branch casing which receives the steam chest, the ejector nozzle being located in the extension and the valve for controlling the admission of the steam to the ejector being located between the lateral steam inlet in the steam chest and the extension.

FRANK GEORGE WILLIAM SPEARS.